United States Patent [19]

Moteki et al.

[11] 4,409,345

[45] Oct. 11, 1983

[54] POLYOLEFIN RESIN COMPOSITION

[75] Inventors: Tsutomu Moteki, Sodegauramachi; Kazuo Aoki, Chibashi; Kunihiro Yamaguchi; Michio Yoshizaki, both of Ichiharashi, all of Japan

[73] Assignee: Chisso Corporation, Osaka, Japan

[21] Appl. No.: 335,678

[22] Filed: Dec. 30, 1981

[30] Foreign Application Priority Data

Jan. 6, 1981 [JP] Japan ................................. 56-614

[51] Int. Cl.³ ............................................. C08L 23/04
[52] U.S. Cl. ........................................ 524/13; 524/27; 524/68; 524/70; 524/71; 525/71
[58] Field of Search ...................... 524/27, 55, 62, 68, 524/70, 71, 77, 13; 525/71

[56] References Cited

U.S. PATENT DOCUMENTS

| | | | |
|---|---|---|---|
| 3,856,724 | 12/1974 | O'Connor et al. | 524/35 |
| 4,032,491 | 6/1977 | Schoenke | 524/68 |
| 4,174,335 | 11/1979 | Ohdaira et al. | 525/71 |
| 4,203,876 | 5/1980 | Dereppe et al. | 524/27 |
| 4,263,184 | 4/1981 | Leo et al. | 524/35 |

*Primary Examiner*—John Kight, III
*Assistant Examiner*—Nathan M. Nutter
*Attorney, Agent, or Firm*—Fred Philpitt

[57] ABSTRACT

A polyolefin resin composition which is suitable mainly for affording superior processing properties of sheet and little in the variation of flowability at hot processing temperatures is provided.

The composition comprises (A) a resin mixture comprising a polypropylene resin and a polyethylene resin, the respective percentages by weight of these resins in the mixture being specified, (B) a polyolefin resin modified with a polymerizable unsaturated carboxylic acid, its salt or its ester by graft polymerization and (C) finely divided vegetable fibers, the ratio of (A) to (B) and the content of (C) in the composition being both specified. Further an agent (D) may be added to the composition, such as petroleum resin, rosin, rosin-like resin, plasticizer or inorganic filler.

4 Claims, No Drawings

POLYOLEFIN RESIN COMPOSITION

BACKGROUND OF THE INVENTION

1. Field of the Invention

This invention relates to a polyolefin resin composition usable mainly for processing of sheet.

2. Description of the Prior Art

When polyolefin resin sheets are subjected to vacuum forming or air pressure forming, olefin homopolymers or copolymers exhibit a heat-sensitive behavior at their thermal deformation temperatures or higher, particularly in the vicinity of their softening temperatures, and in particular, their melt viscosities suddenly drop within a very narrow temperature range. In the processing of sheet, generally a sudden change of viscosity in the vicinity of the processing temperature makes the forming properties inferior and also makes a uniform forming fabrication impossible. Thus, use of resins having different melting points in admixture has been tried for improving the hot processing characteristics of resins, resulting, however, in degrading the compatibilities of resins with each other. For example, in the case of polypropylene-polyethylene blends, it is possible to improve their compatibilities by replacing polypropylene by a propylene-ethylene copolymer or adding a synthetic rubber composed mainly of an ethylene-propylene copolymer. However, even these blends have such problems that their melt viscosities are not always high and their flowability cannot be sufficiently improved.

On the other hand, with regard to resin compositions proposed for solving these problems, Japanese patent publication No. Sho 46-43990/1971 discloses a resin composition consisting of a graft-modified polypropylene and a granular cellulosic high molecular weight substance. However, such a composition has drawbacks in that it is inferior in the resin processing temperature and deficient in the processing stability at the time of forming shaped articles.

Further, Japanese patent application laid-open No. Sho 56-34737/1981 discloses a composition consisting of a polypropylene block copolymer, a high density polyethylene, a plasticizer, a petroleum resin and vegetable fibers, but vacuum forming properties are not always satisfactory.

Furthermore Japanese patent application laid-open No. Sho 55-25495/1980 discloses a composition consisting of a high density polyethylene modified with maleic anhydride and cellulosic fibers, but such a composition is also inferior in the heat-resistance and the vacuum forming properties.

The object of the present invention is to solve these problems and provide a polyolefin resin composition which is suitable mainly for affording superior processing properties of sheet and little in the variation of flow characteristics at hot processing temperatures.

SUMMARY OF THE INVENTION

A first aspect of the present invention resides in:

a polyolefin resin composition comprising (A) a resin mixture comprising 50 to 92% by weight of a polypropylene resin and 8 to 50% by weight of a polyethylene resin, each based on the weight of said resin mixture;

(B) a modified polyolefin resin obtained by graft-polymerizing at least one monomer selected from the group consisting of polymerizable unsaturated carboxylic acids, their salts and their esters; and (C) finely divided vegetable fibers, the ratio by weight of (A) the resin mixture to (B) the modified polyolefin resin being in the range of 55:45 to 99:1, and the content of (C) the vegetable fibers being in the range of 15 to 70% by weight based on the dry weight of the fibers and based on the weight of the composition.

A second aspect of the present invention resides in:

a polyolefin resin composition having further added to the above polyolefin resin composition, (D) an agent selected from either at least one resin selected from the group consisting of petroleum resins, rosins and rosin-like resins, or a plasticizer, or/and as another agent, an inorganic filler, the content of (D) being in the range of 0.1 to 30% by weight based on the weight of the composition, and the ratio of (A) to (B) and the content of (C) being the same as those of the aforementioned composition.

DESCRIPTION OF PREFERRED EMBODIMENTS

The resin mixture (A) of the present invention comprises 50 to 92% by weight of a polypropylene resin and 8 to 50% by weight of a polyethylene resin, each based on the weight of the resin mixture, as described above, and preferably 70 to 92% by weight of a polypropylene resin and 8 to 30% by weight of a polyethylene resin, and is obtained by merely blending or mixing the respective resins in definite amounts.

The polypropylene resin referred to herein means propylene homopolymer, copolymers of propylene with another olefin or mixtures thereof. The propylene homopolymer used may be a usual one, and as the copolymers of propylene with another olefin, block copolymers or random copolymers containing up to 40% by weight of ethylene or butene can be illustrated.

The resin mixture of the present invention may have, if necessary, an ethylene-propylene rubbery copolymer and/or terpolymer incorporated therein. Its amount used is preferably in the range of 1 to 30% by weight based on the weight of the resin mixture or 1 to 10% by weight based on the weight of the composition.

As the above polyethylene resin, a high density polyethylene or a medium or low density polyethylene obtained by copolymerizing ethylene with propylene or another olefin is mainly used.

The modified polyolefin resin (B) of the present invention can be obtained by subjecting at least one monomer selected from polymerizable unsaturated carboxylic acids, their salts and their esters to graft polymerization onto a polyolefin resin. As the polymerizable monomer, acrylic acid, methacrylic acid, maleic anhydride, esters thereof or amides thereof may be used alone or in admixture, and as the polyolefin resin to be grafted, polypropylene, copolymers or terpolymers of propylene with ethylene or/and butene or polyethylene may be used. The modified polyolefin resin may be prepared according to a process wherein the polyolefin resin and the polymerizable monomer are dissolved in a solvent such as toluene, xylene, etc. and subjected to graft polymerization on heating in the presence of an organic peroxide, followed by recovering the resulting graft-modified polyolefin resin; a process wherein the polyolefin resin is contacted with the polymerizable monomer under irradiation of an ionic radiation; a process wherein a mixture of the polyolefin resin, the polymerizable monomer and a radical initiator is melted and kneaded in an extruder or a kneader; or the like method.

The modified polyolefin resin in the composition of the present invention is effective for enhancing the bonding strength between the vegetable fibers and the resin mixture. Namely the modified polyolefin resin is effective for uniformly dispersing the vegetable fibers to thereby minimize the strength reduction of the resins due to their mixing and blending and also retain the affinity of the resin mixture to the fibers. As for the amount of the modified polyolefin resin used, when a suitable amount of the graft-modified polyolefin resin is prepared in advance and blended in other components to obtain the composition, the content of the graft moiety in the modified polyolefin resin varies and also the physical properties of the ultimate resin composition vary depending on the properties and amount of the polyolefin resin to be grafted; hence the above amount cannot be simply regulated, but can be determined in terms of a proportion by weight of the polymerizable monomer relative to the total polyolefin resins in the composition. The content of the polymerizable monomer bonded in the modified polyolefin resin by graft polymerization is necessary to be 0.01% by weight or higher, relative to the total polyolefin resins in the composition. If it is less than 0.01% by weight, its addition effectiveness is small, the vegetable fibers cannot be uniformly admixed, and the improvement in the properties such as strengths is not exhibited.

The ratio by weight of the resin mixture (A) to the modified polyolefin resin (B) is in the range of 55:45 to 99:1 as described above, and it is preferred to be in the range of 60:40 to 99:1.

As the vegetable fibers (C) used in the present invention, finely divided pulps, finely divided used papers such as newspapers, magazines, corrugated boards, etc., finely divided non-woven rayon cloth or cotton cloth, finely divided wood pieces, etc. can be illustrated. Particularly large fiber lengths are undesirable and the fibers are preferably disentangled. Those which are disentangled and dispersed by kneading may be used. The fiber lengths and diameters are preferred to be ultimately 300$\mu$ or less and 30$\mu$ or less, respectively. When such fibers are used, uneven orientation and dispersion of fibers and cohesion thereof are slight at the time of forming by means of e.g. in-line screw type mixer, extruder, flat die, etc. These fibers are prepared from wood pieces, wood powders, papers, pulps, etc. by grinding or milling by means of various grinders or mills, and particularly when the composition is prepared, it is necessary to dry and use them. The amount of vegetable fibers added and used is usually only up to 20% by weight due to non-affinity thereof to polyolefin resins such as polypropylene, but, in the case of the composition of the present invention, the upper limit of the blendable amount can be in the range of 15 to 70% by weight, and such fibers not only bring about processing stability at the time of forming shaped articles, but enhance the strengths of the resulting composition. When the vegetable fibers are uniformly dispersed in the composition, they are also almost uniformly dispersed in the respective polypropylene, polyethylene and copolymer which may otherwise cause phase separation; thereby reduction in the physical properties due to separation and peeling of the respective resin layers from each other is prevented, and moreover even when the fluidity of polyethylene having a lower melting point is enhanced by heating at the time of processing, the variation in the properties of the composition relative to the processing temperature is very little due to the restraining or thickening effect of the dispersed fibers to improve the processing characteristics.

As the plasticizer among the agents (D) of the present invention, carboxylic acid ester plasticizers such as butyl stearate, dioctyl adipate, diisodecyl adipate, dioctyl phthalate, diisodecyl phthalate, dihexyl phthalate, dibutyl phthalate, polyisobutylene, polyester plasticizers, epoxy compound plasticizers, etc. are illustrated. As the petroleum resin, rosin or rosin-like resin, rosins, gum rosins, hydrogenated rosins, rosins modified with glycerine, rosins modified with maleic acid, rosin esters, petroleum resins having a softening point of 50° to 130° C., etc. are illustrated. These materials improve the wetting characteristics of the vegetable fibers on the surface thereof. The amount of the above resin or plasticizer used is in the range of 0.3 to 4% by weight, preferably 0.3 to 2% by weight based on the composition. For example, when about 1% by weight of a rosin is used, it is possible to shorten the time required for melt-kneading by about 10%. If the plasticizer is used in an amount of 4% by weight or more, the heat resistance and strengths such as toughness are reduced. Use of 1 to 30% by weight, preferably 1 to 10% by weight of the inorganic filler is effective for improving the dispersion of the vegetable fibers, but use of the inorganic filler is also effective for improving heat resistance, impact strength, fire retardance, etc.; when improvements in such properties are aimed, 5 to 30% by weight thereof may be used. The ratio by weight of the inorganic filler to the vegetable fibers is preferably less than 1. If it exceeds 1, the dimensional stability of the resulting shaped articles obtained by processing is reduced and particularly the forming properties are degraded.

As the inorganic filler, those which are generally used, such as calcium carbonate, magnesium silicate, barium sulfate, calcium sulfate, talc, etc. are preferably used, and its average particle size is preferably about 10$\mu$ or less.

Further, various fabrication additives are preferably added to the composition of the present invention, such as antioxidants e.g. butylated hydroxytoluene, tetraxis [methylene-3-(3',5'-di-tert-butyl-4'-hydroxyphenyl)propionate] methane, etc. as heat-resistant stabilizers, lubricants such as higher fatty acid salts e.g. magnesium stearate, each in an amount of e.g. 0.03 to 0.3% by weight.

For forming the composition of the present invention, extrusion molding, injection molding, etc. may be employed, but the composition is advantageous particularly when it is once molded into sheets by extrusion molding, calendering or the like means, followed by processing the sheets by vacuum forming or the like means. Further the composition of the present invention has the following advantages besides the above-mentioned processing characteristics:

the shaped articles prepared from the composition of the present invention have a composition wherein the vegetable fibers are almost uniformly dispersed in the form of a matrix structure, between a polypropylene resin and a polyethylene resin which are otherwise substantially incompatible with each other; this minimizes reduction in the mechanical strengths of the composition due to peeling of the polypropylene layer and the polyethylene layer on the interface therebetween or the like to thereby improve as a whole the mechanical strengths and general dynamic characteristics of the resulting composition, whereby the resin composition, when processed, yields shaped articles having a superior dimensional stability, a small percentage shrinkage and also an excellent coating characteristic.

The present invention will be further described by way of Examples and Comparative examples.

The components as raw materials used in these Examples and Comparative examples are as follows:

(1) Propylene-ethylene block copolymer
Melt flow rate (MFR): 3.0 g/10 min.
Ethylene content: 8.0% by weight
(Chissopolypro K-7014, a tradename of product manufactured by Chisso Corporation)

(2) Propylene homopolymer
MFR: 35 g/10 min.
(Chissopolypro K-1014, a tradename of product manufactured by Chisso Corporation)

(3) Propylenic random copolymer
This contains 2.5% of ethylene and 4.5% of butene-1.
MFR: 3.5 g/10 min.
(Chissopolypro XF 2345, a tradename of product manufactured by Chisso Corporation)

(4) High density polyethylene
Melt index (MI): 0.4 g/10 min.
Number of branches per 1,000 carbon atoms: 2.5
(Chissopolyethy XE-185, a tradename of product manufactured by Chisso Corporation)

(5) Ethylene-propylene rubber (abbreviated hereinafter to EPR)
Ethylene content: 80% by weight
MFR: 2.0 g/10 min.
(Tacmer P-0680, a tradename of product manufactured by Mitsui Petrochemicals)

(6) Resin mixture
The above polymers (1) to (5) were respectively blended in ratios indicated in Tables 1~11 mentioned below.

(7) Modified polyolefin resin
(i) Modified polypropylene obtained by graft-polymerization of 0.5% by weight of maleic anhydride, and having a MFR of 20 g/min.
(ii) Modified propylene-ethylene block copolymer obtained by graft-polymerization of 0.5% by weight of maleic anhydride onto a propylene-ethylene block copolymer (ethylene content: 8.0% by weight), and having a MFR of 4.5 g/10 min.
(iii) Modified low density polyethylene obtained by graft-polymerization of 1.8% by weight of acrylic acid, and having a MI of 4.0 g/10 min.
(iv) Modified polypropylene obtained by graft-polymerization of 4.0% by weight of acrylic acid, and having a MFR of 5.5 g/10 min.
(v) Modified low density polyethylene obtained by graft-polymerization of 0.5% by weight of maleic anhydride, and having a MI of 5.0 g/10 min. and a density of 0.91 g/cm³
(vi) Modified low density polyethylene obtained by graft-polymerization of 2.5% by weight of maleic anhydride, and having a MI of 2 g/10 min. and a density of 0.92 g/cm³
(vii) Modified high density polyethylene obtained by graft-polymerization of 0.5% by weight of maleic anhydride, and having a MI of 0.5 g/10 min. and a density of 0.95 g/cm³

(8) Vegetable fibers
Those obtained by milling small pieces of newspaper (size: about 1 cm) by means of a turbocutter (manufactured by Turbo Industry Co.)

(9) Plasticizer
Butyl stearate was used.

(10) Petroleum resin
An alicyclic saturated hydrocarbon having a softening point (according to ring and ball method) of 125° C., a specific gravity (at 20° C.) of 0.999 and a molecular weight of 820 (Arkon P-125, a tradename of product manufactured by Arakawa Kagaku Kogyo K.K.)

(11) Ester gum
This has a softening point (according to ring and ball method) of 82° C. and an acid value of 7 (Ester gum a tradename of product manufactured by Arakawa Kagaku Kogyo K.K.)

The compositions of the present invention were subjected to injection molding to prepare test pieces of shaped articles which were then tested according to the following methods:

| | |
|---|---|
| MFR | according to JIS K6758 (at 230° C.) |
| MI | according to JIS K6758 (at 190° C.) |
| Density | according to JIS K7112 |
| Tensile strength | according to JIS K7113 |
| Elongation | according to JIS K7113 |
| Bending modulus | according to JIS K7203 |
| Izod impact strength | according to JIS K7110 (notched) |
| Thermal deformation temperature | according to JIS K7207 |
| Linear expansion coefficient | temperature range, −20° to +70° C. |
| Dispersibility of vegetable fibers | judged from the dispersion of characteristic values and the surface smoothness of shaped articles. |

As for the processing properties of sheets prepared from the composition of the present invention, pellets of the composition were subjected to extrusion molding (using an extruder of 60 mm φ) to prepare a sheet of 2 mm thick, which was then subjected to vacuum forming by means of a vacuum forming machine in which a box die having a size of 600 mm×450 mm and a maximum draw depth of 100 mm was set, on heating up to 160° C. to obtain a shaped article, which was then tested together with its thickness and surface smoothness, with respect of the vacuum forming properties. The properties were judged under the following evaluations:

| Vacuum forming properties | | |
|---|---|---|
| very good ...Ⓞ; | good ... o; | somewhat inferior ... Δ; |
| inferior ... x; | far inferior ... xx | |

Further, heating behavior also exhibiting whether the vacuum forming is good or inferior was tested. Namely, sheets of 400 mm×400 mm×2.0 mm (thick) were heated in a horizontally tensioned state in an atmosphere heated to 180° C. by an infrared heater, to observe their heating behaviors. The sheets once sagged at their central portion, then recovered from the sag, kept this recovered state (still standing), for a while, and thereafter softened and again sagged to a large extent. The first sag (sagging quantity unit: mm), the percentage recovery from the first sag (recovered quantity (mm)/sagging quantity (mm)×100) and the period (sec.) during which the recovery was kept, were measured. Those having a smaller sag, a higher percentage recovery from sag and a longer period of the recovery maintenance were obtained and forming troubles were fewer.

EXAMPLES 1~8

In each of these Examples, a resin mixture indicated in Table 1 mentioned below, a modified polypropylene obtained by graft-polymerizing 0.5% by weight of maleic anhydride (indicated above in 7), (i)), and vegetable fibers indicated above in 8), were blended together in a ratio indicated in Table 1, and kneaded on heating at 170° C. by means of a kneader. When the resin melted and began to be impregnated in the vegetable fibers, the mixture was extruded into pellets by means of an extruder under conditions where a resin temperature of 190° C. was given, to obtain a polyolefin resin composition.

The respective compositions obtained in these Examples were tested in a definite manner. The results are shown in Table 1. The results of the vacuum forming properties (heating behavior of sheet) of Example 4 are shown in Table 6.

COMPARATIVE EXAMPLES 1 AND 2

These Comparative examples were carried out in the same manner as in Examples 1~8 except that the modified polypropylene was not used. The results are shown in Table 1, and the vacuum forming properties (heating behavior of sheet) of Comparative example 1 are shown in Table 6.

COMPARATIVE EXAMPLE 3

Example 4 was repeated except that a propylene-ethylene block copolymer indicated above in (1) was used in place of the resin mixture. The results are shown in Table 1.

EXAMPLES 9~11

Example 3 was repeated except that the modified polypropylene with 0.5% by weight of maleic anhydride was replaced by a propylene-ethylene block copolymer modified with 0.5% by weight of maleic anhydride (indicated above in 7), (ii)), a low density polyethylene modified with 1.8% by weight of acrylic acid (indicated above in 7), (iii)), or a polypropylene modified with 4.0% by weight of acrylic acid (indicated above in 7), (iv)). The results are shown in Table 2.

COMPARATIVE EXAMPLE 4

Example 10 was repeated except that a propylene-ethylene block copolymer indicated above in (1) was used in place of the resin mixture. The results are shown in Table 2.

TABLE 1

| Example or Comparative example | | Example | | | | | | | | Comparative example | | |
|---|---|---|---|---|---|---|---|---|---|---|---|---|
| | | 1 | 2 | 3 | 4 | 5 | 6 | 7 | 8 | 1 | 2 | 3 |
| Contents of polymers in resin mixture (% by weight) | Block PP*1 | 81.5 | 80.8 | 80 | 77.8 | 75 | 66.7 | 50 | 71.4 | 81.8 | 66.7 | 100 |
| | PE*4 | 18.5 | 19.2 | 20 | 22.2 | 25 | 33.3 | 50 | 28.6 | 18.2 | 33.3 | — |
| Composition (% by weight) | | | | | | | | | | | | |
| (A) Resin mixture | | 54 | 52 | 50 | 45 | 40 | 30 | 20 | 35 | 55 | 30 | 45 |
| (B) (i) Polypropylene modified with 0.5% maleic anhydride | | 1 | 3 | 5 | 10 | 10 | 10 | 10 | 20 | — | — | 10 |
| (C) Vegetable fibers | | 45 | 45 | 45 | 45 | 50 | 60 | 70 | 45 | 45 | 70 | 45 |
| Physical properties of shaped articles | | | | | | | | | | | | |
| Density [g/cm$^3$] | | 1.095 | 1.095 | 1.095 | 1.095 | 1.115 | 1.152 | 1.195 | 1.095 | 1.095 | 1.192 | 1.095 |
| Tensile strength [Kg/cm$^2$] | | 269 | 294 | 323 | 344 | 341 | 334 | 305 | 358 | 265 | 203 | 380 |
| Elongation [%] | | 4 | 6 | 8 | 9 | 8 | 5 | 4 | 13 | 3 | (2 or less) | 4 |
| Bending modulus [× 10$^4$ Kg/cm$^2$] | | 2.6 | 2.8 | 2.9 | 3.1 | 3.3 | 3.7 | 4.0 | 3.4 | 2.5 | 3.3 | 3.2 |
| Izod impact strength [Kg-cm/cm] | | 2.9 | 3.5 | 3.8 | 4.2 | 4.1 | 3.6 | 2.9 | 4.6 | 2.8 | 1.3 | 3.0 |
| Thermal deformation temperature (4.6 Kg/cm$^2$) [°C.] | | 127 | 134 | 138 | 141 | 142 | 145 | 147 | 147 | 124 | 135 | 151 |
| Rockwell hardness [R scale] | | 86 | 88 | 90 | 93 | 96 | 102 | 104 | 98 | 84 | 95 | 90 |
| Percentage forming shrinkage [%] | | 0.47 | 0.45 | 0.45 | 0.44 | 0.43 | 0.41 | 0.40 | 0.47 | 0.47 | 0.42 | 0.46 |
| Linear expansion coefficient [× 10$^{-6}$ cm/cm/°C.] | | 4.3 | 4.3 | 4.2 | 4.2 | 4.1 | 4.1 | 4.0 | 4.3 | 4.3 | 4.1 | 4.2 |
| Vacuum forming properties | | Δ | o | o | ⊚*6 | o | Δ | Δ | o | x*6 | x | x |

*1see page 11, 1),
*4see page 12, 4),
*6see Table 6

TABLE 2

| Example or Comparative example | | Example | | | | Comparative example | |
|---|---|---|---|---|---|---|---|
| | | 9 | 10 | 11 | 3 | 4 | 1 |
| Contents of polymers in resin mixture (% by weight) | Block PP*1 | 80 | 80 | 80 | 80 | 100 | 81.8 |
| | PE*4 | 20 | 20 | 20 | 20 | 0 | 18.2 |
| Composition (% by weight) | | | | | | | |
| (A) Resin mixture | | 50 | 50 | 50 | 50 | 50 | 55 |
| (B) (i) Polypropylene modified with 0.5% maleic anhydride | | — | — | — | 5 | — | — |
| (ii) Block copolymer modified with 0.5% maleic anhydride | | — | — | 5 | — | — | — |
| (iii) Low density polyethylene modified with 1.8% acrylic acid | | 5 | — | — | — | — | — |
| (iv) Polypropylene modified with 4.0% acrylic acid | | — | 5 | — | — | 5 | — |

TABLE 2-continued

| Example or Comparative example | Example | | | | Comparative example | |
|---|---|---|---|---|---|---|
| | 9 | 10 | 11 | 3 | 4 | 1 |
| Polymerizable unsaturated carboxylic acid based on polyolefin resin in composition (%) | 0.16 | 0.36 | 0.05 | 0.05 | 0.36 | 0 |
| (C) Vegetable fibers | 45 | 45 | 45 | 45 | 45 | 45 |
| Physical properties of shaped articles | | | | | | |
| Density (g/cm$^3$) | 1.095 | 1.095 | 1.095 | 1.095 | 1.095 | 1.095 |
| Tensile strength (Kg/cm$^2$) | 316 | 325 | 320 | 323 | 359 | 265 |
| Elongation (%) | 9 | 8 | 8 | 8 | 2 | 3 |
| Bending modulus ($\times 10^4$ Kg/cm$^2$) | 2.7 | 3.0 | 3.0 | 2.9 | 3.3 | 2.5 |
| Izod impact strength (Kg-cm/cm) | 4.0 | 3.9 | 3.9 | 3.8 | 2.0 | 2.8 |
| Thermal deformation temperature (4.6 Kg/cm$^2$) (°C.) | 133 | 136 | 138 | 138 | 150 | 124 |
| Rockwell hardness (R scale) | 87 | 92 | 89 | 90 | 91 | 84 |
| Percentage forming shrinkage (%) | 0.46 | 0.45 | 0.45 | 0.45 | 0.49 | 0.47 |
| Linear expansion coefficient ($\times 10^{-6}$ cm/cm/°C.) | 4.3 | 4.2 | 4.2 | 4.2 | — | 4.3 |
| Vacuum forming properties | o | o | o | o | xx | x*6 |

*1, *4, *6 same as those in Table 1

Tables 1 and 2 show that if neither modified polyolefin resin nor resin mixture of the present invention is used, the vacuum forming properties of the resulting compositions are inferior, thus those of the compositions of the present invention are superior. Further, when Example 4 is compared with Comparative example 1 in Table 6, it is seen that sheets obtained from the compositions of the present invention have a smaller sag quantity, a higher percentage recovery from sag and a longer period of the recovery maintenance and troubles at the time of vacuum forming are fewer.

EXAMPLES 12 AND 13

Example 4 was repeated except that EPR was added as a resin component of the resin mixture as shown in Table 3. The results are shown in Table 3.

EXAMPLES 14 AND 15

These Examples were carried out in the same manner as in Examples 12 and 13 except that the ethylene-propylene block copolymer was replaced by a propylene homopolymer or a random copolymer indicated above in (2) or (3), and also resin mixtures shown in Table 3 were used. The results are shown in Table 3.

COMPARATIVE EXAMPLE 5

This Comparative example was carried out in the same manner as in Examples 12~15 except that the resin mixture was replaced by a propylene homopolymer indicated above in (2). The results are shown in Table 3.

TABLE 3

| Example or Comparative example | | Example | | | | Comparative example |
|---|---|---|---|---|---|---|
| | | 12 | 13 | 14 | 15 | 5 |
| Contents of polymers in resin mixture (% by weight) | Block PP*1 | 77.8 | 66.7 | — | — | — |
| | Homo PP*2 | — | — | 55.6 | — | 100 |
| | Random PP*3 | — | — | — | 55.6 | — |
| | PE*4 | 11.1 | 11.1 | 22.2 | 22.2 | — |
| | EPR*5 | 11.1 | 11.1 | 22.2 | 22.2 | — |
| Composition (% by weight) | | | | | | |
| (A) Resin mixture | | 45 | 45 | 45 | 45 | 45 |
| (B) (i) Polypropylene modified with 0.5% maleic anhydride | | 10 | 10 | 10 | 10 | 10 |
| (C) Vegetable fibers | | 45 | 45 | 45 | 45 | 45 |
| Physical properties of shaped articles | | | | | | |
| Density [g/cm$^3$] | | 1.093 | 1.093 | 1.095 | 1.094 | 1.095 |
| Tensile strength [Kg/cm$^2$] | | 306 | 293 | 318 | 285 | 360 |
| Elongation [%] | | 8 | 10 | 3 | 6 | 2 |
| Bending modulus [$\times 10^4$ Kg/cm$^2$] | | 3.0 | 2.7 | 2.7 | 2.5 | 3.3 |
| Izod impact strength [Kg-cm/cm] | | 4.5 | 4.7 | 2.4 | 3.3 | 1.9 |
| Thermal deformation temperature (4.6 Kg/cm$^2$) [°C.] | | 133 | 128 | 146 | 127 | 155 |
| Rockwell hardness [R scale] | | 87 | 84 | 88 | 83 | 92 |
| Percentage forming shrinkage [%] | | 0.53 | 0.57 | 0.51 | 0.54 | 0.45 |
| Linear expansion coefficient [$\times 10^{-6}$ cm/cm/°C.] | | — | — | — | — | 4.3 |
| Vacuum forming properties | | o | o | Δ | o | xx |

*1~*5 see pages 11 and 12, 1)~5)

As seen from Table 3, the composition obtained by replacing the resin mixture of the present invention by a propylene homopolymer alone is inferior in the vacuum forming properties, whereas the compositions of the present invention are superior therein.

EXAMPLES 16~23

These Examples were carried out in the same manner as in Examples 1~8 except that various agents were added as a component of the composition in blending ratios indicated in Table 4. The results are shown in Table 4. The vacuum forming properties (heating behavior of sheet) of Example 18 are shown in Table 6.

COMPARATIVE EXAMPLE 6

This Comparative example was carried out in the same manner as in Examples 16~23 except that no modified polyolefin was used. The results are shown in Table 4.

COMPARATIVE EXAMPLE 7

Results obtained from a composition consisting of a block copolymer and talc are shown in Table 4.

When Table 4 is compared with Table 1, it is seen that use of calcium carbonate or the like agent improves the vacuum forming properties. However, it is seen from Comparative example 6 that if no modified polyolefin is used, the vacuum forming properties are inferior and also the dispersibility of vegetable fibers is inferior. Further the results of Example 18 in Table 6 show that the vacuum forming properties of the sheet prepared from the composition of the present invention are superior.

TABLE 4

| Example or Comparative example | | 16 | 17 | 18 | 19 | 20 | 21 | 22 | 23 | Comparative example 6 | Comparative example 7 |
|---|---|---|---|---|---|---|---|---|---|---|---|
| Contents of polymers in resin mixture (% by weight) | Block PP*[1] | 83.1 | 82.5 | 81.8 | 80 | 88.4 | 88.4 | 86.8 | 81.8 | 83.3 | 100 |
|  | PE*[4] | 16.9 | 17.5 | 18.2 | 20 | 11.6 | 11.6 | 13.2 | 18.2 | 16.7 | 0 |
| Composition (% by weight) | | | | | | | | | | | |
| (A) | Resin mixture | 59 | 57 | 55 | 50 | 43 | 43 | 38 | 55 | 60 | 60 |
| (B) | (i) Polypropylene modified with 0.5% maleic anhydride | 10 | 10 | 10 | 10 | 10 | 10 | 10 | 10 | — | — |
| (C) | Vegetable fibers | 30 | 30 | 30 | 30 | 45 | 45 | 45 | 30 | 30 | — |
| (D) | Calcium carbonate | 1 | 3 | 5 | 10 | — | — | 5 | — | 10 | — |
|  | Talc | — | — | — | — | — | — | — | 5 | — | 40 |
|  | Plasticizer (butyl stearate) | — | — | — | — | 2 | — | 2 | — | — | — |
|  | Rosin/petroleum resin (Arkon-P125) | — | — | — | — | — | 2 | — | — | — | — |
| Physical properties of shaped articles | | | | | | | | | | | |
| Density [g/cm$^3$] | | 1.089 | 1.091 | 1.094 | 1.097 | 1.091 | 1.091 | 1.094 | 1.095 | 1.097 | 1.25 |
| Tensile strength [Kg/cm$^2$] | | 258 | 281 | 287 | 305 | 325 | 331 | 334 | 296 | 257 | 325 |
| Elongation [%] | | 5 | 7 | 8 | 10 | 11 | 8 | 12 | 7 | 4 | 7 |
| Bending modulus [× 10$^4$ Kg/cm$^2$] | | 2.2 | 2.3 | 2.3 | 2.5 | 2.7 | 3.2 | 3.0 | 2.5 | 2.2 | 4.3 |
| Izod impact strength [Kg-cm/cm] | | 3.3 | 3.8 | 4.1 | 4.4 | 4.5 | 4.3 | 4.8 | 4.0 | 3.0 | 3.0 |
| Thermal deformation temperature (4.6 Kg/cm$^2$) [°C.] | | 120 | 125 | 128 | 133 | 127 | 131 | 133 | 130 | 131 | 140 |
| Rockwell hardness [R scale] | | 81 | 85 | 88 | 89 | 84 | 96 | 88 | 89 | 81 | 105 |
| Percentage forming shrinkage [%] | | 0.65 | 0.58 | 0.53 | 0.49 | 0.43 | 0.41 | 0.42 | 0.52 | 0.51 | 1.04 |
| Dispersibility of vegetable fibers | | somewhat good | good | good | good | good | good | good | good | bad | — |
| Vacuum forming properties | | ◎ | ◎ | ◎*[6] | o | o | o | o | o | x | xx |

*[1], *[4], *[6] same as those in Table 1

EXAMPLES 24~29

These Examples were carried out in the same manner as in Examples 12~15 except that various agents were added and blended as indicated in Table 5. The results are shown in Table 5.

When Examples in Table 5 are compared with Examples 12 and 13 in Table 3, it is seen that in the case of the composition wherein a resin mixture containing EPR is used, use of butyl stearate or rosin/petroleum resin as a mixing agent improves the vacuum forming properties and also improves the Izod impact strength and elongation of shaped articles.

TABLE 5

| | | Example 24 | 25 | 26 | 27 | 27' | 28 | 29 |
|---|---|---|---|---|---|---|---|---|
| Contents of polymers in resin mixture (% by weight) | Block PP*[1] | 76.7 | 76.7 | 73.6 | 73.6 | 73.6 | 75.0 | 62.5 |
|  | PE*[4] | 11.6 | 11.6 | 13.2 | 13.2 | 13.2 | 12.5 | 12.5 |
|  | EPR*[5] | 11.6 | 11.6 | 13.2 | 13.2 | 13.2 | 12.5 | 25.0 |
| Composition (% by weight) | | | | | | | | |
| (A) | Resin mixture | 43 | 43 | 38 | 39 | 38 | 40 | 40 |
| (B) | (i) Polypropylene modified with 0.5% maleic anhydride | 10 | 10 | 10 | 10 | 10 | 10 | 10 |
| (C) | Vegetable fibers | 45 | 45 | 45 | 45 | 45 | 45 | 45 |
| (D) | Calcium carbonate | — | — | 5 | 5 | 5 | 5 | 5 |
|  | Plasticizer (butyl stearate) | 2 | — | 2 | 1 | — | — | — |
|  | Rosin/petroleum resin (Arkon-P125) | — | 2 | — | — | 2 | — | — |
| Physical properties of shaped articles | | | | | | | | |
| Density [g/cm$^3$] | | 1.092 | 1.092 | 1.094 | 1.094 | 1.094 | 1.095 | 1.094 |
| Tensile strength [Kg/cm$^2$] | | 322 | 338 | 335 | 340 | 343 | 317 | 310 |
| Elongation [%] | | 14 | 10 | 15 | 12 | 10 | 10 | 14 |
| Bending modulus [× 10$^4$ Kg/cm$^2$] | | 2.5 | 2.9 | 2.7 | 3.1 | 3.3 | 3.2 | 2.9 |
| Izod impact strength [Kg-cm/cm] | | 5.3 | 4.9 | 5.7 | 5.2 | 5.1 | 4.8 | 5.4 |
| Thermal deformation temperature (4.6 Kg/cm$^2$) [°C.] | | 126 | 128 | 130 | 131 | 132 | 135 | 131 |
| Rockwell hardness [R scale] | | 80 | 85 | 83 | 86 | 87 | 93 | 89 |
| Percentage forming shrinkage [%] | | 0.49 | 0.46 | 0.48 | 0.47 | 0.47 | 0.49 | 0.54 |
| Dispersibility of vegetable fibers | | good | good | good | good | good | good | somewhat |

TABLE 5-continued

| | Example | | | | | | |
|---|---|---|---|---|---|---|---|
| | 24 | 25 | 26 | 27 | 27' | 28 | 29 |
| Vacuum forming properties | ◎ | ◎ | ◎ | ◎ | ◎ | o | good o |

*1, *4, *5 same as those in Table 3

TABLE 6

| Example or Comparative example | Example | | Comparative example |
|---|---|---|---|
| | 4 | 18 | 1 |
| Heating behavior | | | |
| Sag quantity [mm] | 18 | 20 | 25 |
| Percentage recovery from sag [%] | 35 | 29 | 20 |
| Recovery maintenance time [sec.] | 21 | 19 | 14 | degrades the vacuum forming properties (see Comparative example 8), and also non-use of the resin mixture and use of a modified low density polyethylene and vegetable fibers alone, the vacuum forming properties are superior, but the tensile strength, bending modulus and heat resistance are inferior (see Comparative examples 9 and 10).

TABLE 7

| | | Example | | | Comparative example | | |
|---|---|---|---|---|---|---|---|
| Example or Comparative example | | 11* | 30 | 31 | 8 | 9 | 10 |
| Contents of polymers in resin mixture (% by weight) | Block PP*1 | 80 | 80 | 80 | 100 | — | — |
| | PE*4 | 20 | 20 | 20 | — | — | — |
| Composition (% by weight) | | | | | | | |
| (A) Resin mixture | | 50 | 50 | 50 | 50 | 0 | 0 |
| (B) Block copolymer modified with 0.5% maleic anhydride (7), (ii) above) | | 5 | — | — | 5 | — | — |
| Low density polyethylene with 0.5% maleic anhydride (7), (v) above) | | — | 5 | — | — | 50 | — |
| Low density polyethylene with 2.5% maleic anhydride (7), (vi) above) | | — | — | 5 | — | — | 50 |
| Polymerizable unsaturated carboxylic acid based on polyolefin resin in composition (%) | | 0.05 | 0.16 | 0.24 | 0.16 | 0.5 | 2.5 |
| (C) Vegetable fibers | | 45 | 45 | 45 | 45 | 50 | 50 |
| Physical properties of shaped articles | | | | | | | |
| Density [g/cm$^3$] | | 1.095 | 1.095 | 1.095 | 1.094 | 1.130 | 1.130 |
| Tensile strength [Kg/cm$^2$] | | 320 | 316 | 320 | 320 | 176 | 180 |
| Elongation [%] | | 8 | 9 | 9 | 3 | 5 | 4 |
| Bending modulus [× 10$^4$ Kg/cm$^2$] | | 3.0 | 2.7 | 2.8 | 3.3 | 1.6 | 1.6 |
| Izod impact strength [Kg-cm/cm] | | 3.9 | 4.0 | 4.2 | 2.5 | 6.3 | 6.5 |
| Thermal deformation temp. (4.6 Kg/cm$^2$) [°C.] | | 138 | 133 | 133 | 137 | 92 | 92 |
| Rockwell hardness [R scale] | | 89 | 87 | 88 | 93 | 50 | 50 |
| Percentage forming shrinkage [%] | | 0.45 | 0.46 | 0.46 | 0.45 | 0.48 | 0.47 |
| Linear expansion coefficient [× 10$^{-6}$ cm/cm/°C.] | | 4.2 | 4.3 | 4.3 | 4.2 | 4.4 | 4.4 |
| Vacuum forming properties | | o | o | o | x-Δ | o | o |

*1, *4 same as those in Table 1
*cited from Table 2

EXAMPLES 30 AND 31

Example 11 was repeated except that modified polyolefin resins indicated in Table 7 were used. The results are shown in Table 7.

COMPARATIVE EXAMPLE 8

Example 11 was repeated except that a propylene-ethylene block copolymer alone was used in place of the resin mixture. The results are shown in Table 7.

COMPARATIVE EXAMPLES 9 AND 10

Examples 30 and 31 were repeated except that no resin mixture was used and other components were used in blending ratios indicated in Table 7. The results are shown in Table 7.

As seen from Table 7, use of an ethylene-propylene block copolymer alone in place of the resin mixture

EXAMPLES 32 AND 33

These Examples were carried out in the same manner as in Examples 16~23 except that components in blending ratios indicated in Table 8 were used. The results are shown in Table 8.

COMPARATIVE EXAMPLES 11~13

These Comparative examples were carried out in the same manner as in Example 16~23 except that no modified polyolefin resin (B) was used and other components in blending ratios indicated in Table 8 were used. The results are shown in Table 8. Further the heating behavior was tested and shown in Table 9.

Table 8 shows that even when the resin mixture of the present invention is used, non-use of a modified polyolefin resin (B) degrades the vacuum forming properties. As seen from Table 9, Comparative examples 11~13 show that the sheets have a larger sag quantity, a smaller percentage recovery from sag and a shorter recovery maintenance time than those in Example 18.

TABLE 8

| Example or Comparative example | | Example 32 | Example 33 | Comparative example 11 | Comparative example 12 | Comparative example 13 |
|---|---|---|---|---|---|---|
| Contents of polymers in resin mixture (% by weight) | Block PP*1 | 79.2 | 79.2 | 79.2 | 79.2 | 80 |
| | PE*4 | 20.8 | 20.8 | 20.8 | 20.8 | 20 |
| Composition (% by weight) | | | | | | |
| (A) Resin mixture | | 48 | 48 | 48 | 48 | 50 |
| (B) (i) Polypropylene modified with 0.5% maleic anhydride | | 10 | 10 | — | — | — |
| (C) Vegetable fibers | | 40 | 40 | 50 | 50 | 40 |
| (D) Calcium carbonate | | — | — | — | — | 10 |
| Talc | | — | — | — | — | — |
| Plasticizer (butyl stearate) | | 2 | — | 1 | 1 | — |
| Rosin/petroleum resin (Arkon-P125) | | — | — | — | 1 | — |
| Ester gum | | — | 2 | 1 | — | — |
| Physical properties of shaped articles | | | | | | |
| Density [g/cm³] | | 1.06 | 1.06 | 1.12 | 1.12 | 1.19 |
| Tensile strength [Kg/cm²] | | 320 | 338 | 335 | 334 | 260 |
| Elongation [%] | | 15 | 10 | 4 | 5 | (2 or less) |
| Bending modulus [× 10⁴ Kg/cm²] | | 2.5 | 2.9 | 3.4 | 3.3 | 2.8 |
| Izod impact strength [Kg-cm/cm] | | 5.5 | 5.0 | 3.1 | 3.4 | 1.6 |
| Thermal deformation temperature (4.6 Kg/cm²) [°C] | | 125 | 130 | 136 | 135 | 139 |
| Rockwell hardness [R scale] | | 78 | 81 | 87 | 88 | 85 |
| Percentage forming shrinkage [%] | | 0.56 | 0.55 | 0.45 | 0.41 | 0.51 |
| Dispersibility of vegetable fibers | | good | good | somewhat good | somewhat good | good |
| Vacuum forming properties | | o | ◎ | Δ–x | Δ–x | xx |

*1, *4, Same as those in Table 1

TABLE 9

| Example or Comparative example | | Example 18* | Comparative example 11 | Comparative example 12 | Comparative example 13 |
|---|---|---|---|---|---|
| Heating behavior | Sag quantity [mm] | 20 | 25 | 26 | 27 |
| | Percentage recovery from sag [%] | 29 | 24 | 21 | 15 |
| | Recovery maintenance time [sec] | 19 | 15 | 14 | 12 |

*cited from Table 6

COMPARATIVE EXAMPLES 14 AND 15

These Comparative examples were carried out in the same manner as in Examples 24~29 except that the polypropylene modified with 0.5% maleic anhydride was not used and components in blending ratios in Table 10 were used. The results are shown in Table 10.

Table 10 shows that absence of a modified polyolefin resin degrades the vacuum forming properties as compared with those in Examples 24~29.

TABLE 10

| Example or Comparative example | | Example 24** | Comparative example 14 | Comparative example 15 |
|---|---|---|---|---|
| Contents of polymers in resin mixture (% by weight) | Block PP*1 | 76.7 | 76.7 | 73.6 |
| | PE*4 | 11.6 | 11.6 | 13.2 |
| | EPR*5 | 11.6 | 11.6 | 13.2 |
| Composition (% by weight) | | | | |
| (A) Resin mixture | | 43 | 53 | 50 |
| (B) Polypropylene modified with 0.5% maleic anhydride ( 7), (i)) | | 10 | — | — |
| (C) Vegetable fibers | | 45 | 45 | 45 |
| (D) Calcium carbonate | | — | — | 5 |
| Plasticizer (butyl stearate) | | 2 | 2 | — |
| Physical properties of shaped articles | | | | |
| Density [g/cm³] | | 1.092 | 1.092 | 1.15 |
| Tensile strength [Kg/cm²] | | 322 | 290 | 300 |
| Elongation [%] | | 14 | 3 | 2 |
| Bending modulus [× 10⁴ Kg/cm²] | | 2.5 | 2.1 | 2.7 |
| Izod impact strength [Kg-cm/cm] | | 5.3 | 3.2 | 3.0 |
| Thermal deformation temperature (4.6 Kg/cm²) [°C] | | 126 | 124 | 132 |
| Rockwell hardness [R scale] | | 80 | — | — |
| Percentage forming shrinkage [%] | | 0.49 | 0.53 | 0.51 |
| Dispersibility of vegetable fibers | | good | somewhat good | somewhat good |
| Vacuum forming properties | | ◎ | x | x |

*1, *4, *5 same as those in Table 3
**cited from Table 5

COMPARATIVE EXAMPLE 16

Example 5 was repeated except that no resin mixture was used and other components in a blending ratio indicated in Table 11 were used. The results are shown in Table 11.

COMPARATIVE EXAMPLE 17

Example 22 was repeated except that no resin mixture was used and other components in a blending ratio indicated in Table 11 were used. The results are shown in Table 11. The results are shown in Table 11.

EXAMPLE 34

Example 5 was repeated except that the polypropylene modified with 0.5% maleic anhydride was replaced by a high density polyethylene modified with 0.5% maleic anhydride. The results are shown in Table 11.

COMPARATIVE EXAMPLE 18

Example 33 was repeated except that the resin mixture was replaced by a high density polyethylene modified 0.5% maleic anhydride. The results are shown in Table 11.

COMPARATIVE EXAMPLES 19 AND 20

Example 5 was repeated except that the content of polyethylene in the resin mixture was increased to those exceeding the range of the present invention. The results are shown in Table 11.

As seen from comparison of Example 5 with Comparative example 16 and comparison of Example 22 with Comparative example 17, non-use of the resin mixture degrades the vacuum forming properties. Further, in the case of use of a modified high density polyethylene (comparison of Example 33 with Comparative example 18), non-use of the resin mixture does not vary the vacuum forming properties, but degrades the heat resistance and the tensile strength.

As seen from Comparative examples 19 and 20, when the contents of polyethylene in the resin mixture are increased to those exceeding the range of the present invention, this degrades the tensile strength and the heat resistance.

by weight of a high density polyethylene resin, each based on the weight of said resin mixture;
(b) a modified polyolefin resin obtained by graft-polymerizing at least one monomer selected from the group consisting of polymerizable unsaturated carboxylic acids, their salts and their esters; and
(c) finely divided vegetable fibers, the ratio by weight of (a) to (b) being in the range of 55:45 to 99:1, and the content of (c) being in the range of 15 to 70% by weight based on the dry weight of the fibers and based on the weight of the composition.

2. A polyolefin resin composition according to claim 1 wherein the content of the units of said monomer in said modified polyolefin resin is 0.01% by weight or higher based on the total weight of the olefin resins contained in said polyolefin resin composition.

3. A polyolefin resin composition comprising
(a) a resin mixture comprising 50 to 92% by weight of a block copolymer of propylene containing at most 40% by weight of ethylene or butene and 8 to 50% by weight of a high density polyethylene resin, each based on the weight of said resin mixture;
(b) a modified polyolefin resin obtained by graft-polymerizing at least one monomer selected from the group consisting of polymerizable unsaturated carboxylic acids, their salts and their esters;
(c) finely divided vegetable fibers; and
(d) an inorganic filler and at least one agent selected from the group consisting of a petroleum resin, rosin, rosin-like resins, and a plasticizer, the ratio by weight of (a) to (b) being in the range of 55:45 to 99:1, the content of (c) being in the range of 15 to 70% by weight based on the dry weight of said fibers and based on the weight of said composition, the amount of said inorganic filler being in the range of 1–30% by weight based on the weight of said composition and the weight of said agent being within the range of 0.3 to 4% by weight based on the weight of said composition.

4. A polyolefin resin composition according to claim 3 wherein the amount of said inorganic filler is lower than the amount of said vegetable fibers.

TABLE 11

| Example or Comparative example | | Example | | | Comparative example | | | | |
|---|---|---|---|---|---|---|---|---|---|
| | | 5* | 22** | 34 | 16 | 17 | 18 | 19 | 20 |
| Contents of polymers in resin mixture (% by weight) | Block PP*1 | 75 | 86.8 | 75 | — | — | — | 30 | 0 |
| | PE*4 | 25 | 13.2 | 25 | — | — | — | 70 | 100 |
| Composition (% by weight) | | | | | | | | | |
| (A) Resin mixture | | 40 | 38 | 40 | 0 | 0 | 0 | 40 | 40 |
| (B) (i) Polypropylene modified with 0.5% maleic anhydride | | 10 | 10 | — | 50 | 48 | — | 10 | 10 |
| (vii) High density polyethylene modified with 0.5% maleic anhydride | | — | — | 10 | — | — | 50 | — | — |
| (C) Vegetable fibers | | 50 | 45 | 50 | 50 | 45 | 50 | 50 | 50 |
| (D) Calcium carbonate | | — | 5 | — | — | 5 | — | — | — |
| Plasticizer (butyl stearate) | | — | 2 | — | — | 2 | — | — | — |
| Physical properties of shaped articles | | | | | | | | | |
| Density [g/cm$^3$] | | 1.115 | 1.094 | 1.116 | 1.114 | 1.093 | 1.118 | 1.115 | 1.116 |
| Tensile strength [Kg/cm$^2$] | | 341 | 334 | 310 | 380 | 355 | 240 | 240 | 170 |
| Elongation [%] | | 8 | 12 | 6 | 2 | 4 | 3 | 10 | 18 |
| Bending Modulus [× 10$^4$ Kg/cm$^3$] | | 3.3 | 3.0 | 2.7 | 3.5 | 3.2 | 2.3 | 2.7 | 1.4 |
| Izod impact strength [Kg-cm/cm] | | 4.1 | 4.8 | 4.3 | 2.7 | 3.0 | 4.8 | 4.9 | 6.5 |
| Thermal deformation temp. (4.6 Kg/cm$^2$) [°C.] | | 142 | 133 | 125 | 153 | 135 | 96 | 105 | 75 |
| Rockwell hardness [R scale] | | 96 | 88 | 88 | 95 | 90 | 78 | 84 | 53 |
| Percentage forming shrinkage [%] | | 0.43 | 0.42 | 0.45 | 0.43 | 0.41 | 0.48 | 0.47 | 0.55 |
| Vacuum forming properties | | o | o | Δ | xx | xx | Δ | o | ◎ |

*1, *4, *6 same as those in Table 1
*cited from Table 1
**cited from Table 4

What is claimed is:

1. A polyolefin resin composition comprising:
(a) a resin mixture comprising 50 to 90% by weight of a block copolymer of propylene containing at most 40% by weight of ethylene or butene and 8 to 50%